United States Patent
Myoung et al.

(10) Patent No.: US 11,575,969 B2
(45) Date of Patent: Feb. 7, 2023

(54) METHOD AND DEVICE FOR REQUESTING NOTIFICATION OF PRODUCT SALES BROADCAST

(71) Applicant: SK STOA CO., LTD., Seoul (KR)

(72) Inventors: Dae Ho Myoung, Seoul (KR); Min Hee Kwon, Seoul (KR)

(73) Assignee: SK STOA CO., LTD., Seoul (KR)

( * ) Notice: Subject to any disclaimer, the term of this patent is extended or adjusted under 35 U.S.C. 154(b) by 0 days.

(21) Appl. No.: 17/517,129

(22) Filed: Nov. 2, 2021

(65) Prior Publication Data

US 2022/0141536 A1    May 5, 2022

(30) Foreign Application Priority Data

Nov. 2, 2020   (KR) .................. 10-2020-0144593

(51) Int. Cl.
| | |
|---|---|
| *H04N 21/472* | (2011.01) |
| *H04N 21/2343* | (2011.01) |
| *H04N 21/478* | (2011.01) |
| *H04N 21/845* | (2011.01) |
| *H04N 21/858* | (2011.01) |

(52) U.S. Cl.
CPC ... *H04N 21/47214* (2013.01); *H04N 21/2343* (2013.01); *H04N 21/47815* (2013.01); *H04N 21/8456* (2013.01); *H04N 21/858* (2013.01)

(58) Field of Classification Search
None
See application file for complete search history.

(56) References Cited

U.S. PATENT DOCUMENTS

| | | | |
|---|---|---|---|
| 10,755,289 B2 | 8/2020 | Seo et al. | |
| 2003/0009759 A1* | 1/2003 | Khoo | H04N 21/25891 348/E7.071 |
| 2003/0182658 A1* | 9/2003 | Alexander | H04N 21/858 725/60 |
| 2005/0229227 A1* | 10/2005 | Rogers | H04N 21/4725 725/115 |

(Continued)

FOREIGN PATENT DOCUMENTS

| | | |
|---|---|---|
| KR | 1020180112333 A | 10/2018 |
| KR | 1020190022068 A | 3/2019 |
| KR | 101980430 B1 | 5/2019 |

OTHER PUBLICATIONS

Notice of Allowance issued in corresponding Korean Application No. 1020200144593, dated Jul. 15, 2021, 5 pages.

(Continued)

*Primary Examiner* — Alexander Q Huerta
(74) *Attorney, Agent, or Firm* — Burris Law, PLLC

(57) ABSTRACT

A method of requesting a broadcast notification present disclosure includes steps of receiving, by a set-top box, a notification request signal for a broadcast and mobile terminal information, transmitting, by the set-top box, the notification request signal and the mobile terminal information to a data server, transmitting, by the data server, a product purchase guide message related to the broadcast to a mobile terminal, and transmitting, in response to the data server receiving a notification request detail request signal and the mobile terminal information from the set-top box, notification request signal information corresponding to the mobile terminal to the set-top box through a network.

16 Claims, 21 Drawing Sheets

(56) References Cited

U.S. PATENT DOCUMENTS

| | | | |
|---|---|---|---|
| 2007/0186252 A1* | 8/2007 | Maggio | H04N 21/4622 |
| | | | 705/28 |
| 2013/0117262 A1* | 5/2013 | Lenahan | H04N 21/2542 |
| | | | 707/736 |
| 2016/0232587 A1* | 8/2016 | McDevitt | G06Q 30/0623 |
| 2017/0078759 A1* | 3/2017 | Bonvolanta | H04N 21/2668 |
| 2018/0146257 A1* | 5/2018 | Seo | H04N 21/8126 |
| 2018/0285897 A1* | 10/2018 | Seo | H04N 21/47815 |
| 2019/0281359 A1* | 9/2019 | Johnson | H04N 21/6581 |

OTHER PUBLICATIONS

Office Action issued in corresponding Korean Application No. 1020200144593, dated Mar. 25, 2021, 7 pages.

* cited by examiner

METHOD AND DEVICE FOR REQUESTING NOTIFICATION OF PRODUCT SALES BROADCAST

CROSS-REFERENCE TO RELATED APPLICATION

The Present Application is based on and claims priority under 35 U.S.C. § 119 to Korean Patent Application No. 10-2020-0144593, filed on Nov. 2, 2020, in the Korean Intellectual Property Office, the disclosure of which is incorporated by reference herein in its entirety.

BACKGROUND

1. Field

Embodiments of the present disclosure relate to a mobile terminal-based notification request system for product sales broadcast and an operating method thereof.

2. Description of the Related Art

With the recent development of TV technology and digital technology, various information has been delivered to viewers through TV. For example, TV home shopping, which provides shopping information through TV, provides various information as technological changes. In addition, with the recent commercialization of digital-based digital TV technology, various contents may be provided through a network such as Internet connected to each home, and Internet Protocol television (IPTV) service is a representative example.

In the IPTV service, various services may be provided to IPTV service subscribers through a set-top box installed in a designated space, such as a home. Among them, a shopping broadcasting service (or commerce broadcasting) provided through a commerce channel may also be provided.

In the case of a commerce business operator producing a shopping broadcasting service, a commerce channel (i.e., a shopping broadcasting service) may be organized in a channel that is slotted and scheduled based on a certain contract.

When the IPTV service subscriber selects a scheduled channel in the set-top box, the set-top box may receive the commerce channel regularly scheduled for that channel and output it through the TV, so that the IPTV service subscriber may watch the commerce channel and use the shopping broadcasting service.

On the other hand, in the case of some shopping broadcasts, product sales are restricted only during the broadcast time of the shopping broadcast. As various shopping broadcasting services are provided, it is difficult for a user to track the schedule of all shopping broadcasting. A user has to check the broadcast schedules of the shopping broadcasting that sell desired product(s) in order to purchase such product(s).

SUMMARY

Embodiments of the present disclosure may manage a broadcast notification request received from a mobile terminal and provide a broadcast notification to each mobile terminal.

However, these problems to be solved by the present disclosure are exemplary, and the scope of the present disclosure is not limited thereto.

Additional aspects will be set forth in part in the description which follows and, in part, will be apparent from the description, or may be learned by practice of the presented embodiments of the disclosure.

A method of requesting a broadcast notification according to an embodiment of the present disclosure may include receiving, by a set-top box, a notification request signal for a broadcast and mobile terminal information, transmitting, by the set-top box, the notification request signal and the mobile terminal information to a data server, transmitting, by the data server, a product purchase guide message related to product information corresponding to the broadcast to a mobile terminal, and transmitting, in response to the data server receiving a notification request detail request signal and the mobile terminal information from the set-top box, notification request signal information corresponding to the mobile terminal to the set-top box through a network.

In some embodiments, the step of receiving of the notification request signal and the mobile terminal information may further include, when the product related to the broadcast is a product capable of being ordered only during a broadcast time, receiving a product order request signal and the mobile terminal information during the broadcast time, and receiving the notification request signal and the mobile terminal information when it is not the broadcast time.

In some embodiments, the step of transmitting of the product purchase guide message may include transmitting the product purchase guide message to the mobile terminal in response to receiving the order request signal and the mobile terminal information when it is within the broadcast time, and transmitting the product purchase guide message to the mobile terminal when it is not the broadcast time.

In some embodiments, the method of requesting the broadcast notification may further include receiving a broadcast notification cancellation request signal and the mobile terminal information, and not transmitting, by the data server, the product purchase guide message to the mobile terminal.

In some embodiments, the product purchase guide message may further include product information including at least one of a product name, broadcast date and time, and a product order link. The product order link is connected to a product order page. In some embodiments, the product order link may be connected to the login page, and the login page may be connected to the product order page after the login is completed.

In some embodiments, the method of requesting the broadcast notification may further include separately performing tagging on the generated order information when the product is ordered using the product purchase guide message.

In some embodiments, the transmitting of a notification request signal information corresponding to the mobile terminal to the set-top box may include, in response to receiving a notification request detail request signal and the mobile terminal information from the set-top box, transmitting only a notification request signal for a broadcast that is not being broadcasted among the notification request signals corresponding to the mobile terminal to the set-top box.

In some embodiments, the notification request signal information may include a plurality of notification request signals, and the transmitting of the notification request signal information to the set-top box may include, when receiving a cancellation request signal for a specific notification request signal among the plurality of notification request signals, not transmitting the specific notification request signal to a set-top box.

In some embodiments, the receiving of the notification request signal for the broadcast and the mobile terminal information may include receiving a notification request signal for a first broadcast and a first mobile terminal information; and receiving the notification request signal for the first broadcast and a second mobile terminal information, and the transmitting, by the data server, the product purchase guide message related to product information corresponding to the broadcast to the mobile terminal may include transmitting, by the data server, a product purchase guide message related to the first broadcast to the first mobile terminal and the second mobile terminal.

In some embodiments, the receiving of the notification cancellation request signal for the broadcast and the mobile terminal information may include receiving a notification cancellation request signal for the broadcast and a first mobile terminal information, and the transmitting of the product purchase guide message may include transmitting, by the data server, the product purchase guide message to the second mobile terminal, and not transmitting the product purchase guide message to the first mobile terminal.

A broadcast notification request system according to another embodiment of the present disclosure may include a data server configured to transmit a message to a mobile terminal; and a media providing server connected to a set-top box, wherein the media providing server may receive a notification request signal for a broadcast and mobile terminal information from the set-top box, requests the data server to transmit a product purchase guide message related to the broadcast, and in response to receiving a notification request detail request signal and the mobile terminal information from the set-top box, transmits notification request signal information corresponding to the mobile terminal to the set-top box.

A method of requesting a broadcast notification includes steps of (i) receiving, at a set-top box, a notification request signal for a broadcast from a selected mobile terminal, (ii) receiving, at the set-top box, mobile terminal information of the selected mobile terminal and associated with the notification request signal, (iii) transmitting, with the set-top box, the notification request signal, and the mobile terminal information to a data server, (iv) transmitting, to the selected mobile terminal, with the data server, a product purchase guide message related to product information corresponding to the broadcast and associated with the notification request signal, (v) receiving, at the data server, a notification request detail request signal, and (vi) in response to the data server receiving the notification request detail request signal and the mobile terminal information from the set-top box, generating resultant notification request signal information corresponding to the selected mobile terminal and transmitting the resultant notification request signal information to the set-top box through a network.

In some embodiments, the step of receiving the notification request signal further includes, with respect to a selected product related to the broadcast available for order to be limited during a broadcast time, receiving a product order request signal and the mobile terminal information during the broadcast time.

In some embodiments, the step of transmitting the product purchase guide message further includes transmitting the product purchase guide message to the selected mobile terminal in response to receiving the order request signal and the mobile terminal information when receipt of the order request signal is within the broadcast time.

In some embodiments, the method further includes steps of receiving a broadcast notification cancellation request signal and another mobile terminal information, and not transmitting, with the data server, the product purchase guide message to the mobile terminal.

In some embodiments, the method further includes steps of upon receiving a purchase order request signal using the product purchase guide message, generating order information relevant to the purchase order request signal, and separately performing tagging on the generated order information.

In some embodiments, the method further includes steps of receiving, at a set-top box, a plurality of notification request signals for the broadcast from a plurality of mobile terminals including the selected mobile terminal, receiving, at the set-top box, a set of mobile terminal information associated with the plurality of notification request signals, and in response to receiving a set of notification request detail request signals and the set of mobile terminal information from the set-top box, generating a set of resultant notification request signal information associated with one or more broadcast that are scheduled to be aired.

In some embodiments, transmitting the resultant notification request signal information further includes upon receiving a cancellation request signal for a specific notification request signal among the plurality of notification request signals, not transmitting the set of resultant notification request signal information to the set-top box.

In some embodiments, receiving the notification request signal for the broadcast and the mobile terminal information further includes receiving a first notification request signal for a first broadcast and first mobile terminal information, and receiving a second notification request signal for the first broadcast and second mobile terminal information, and transmitting the product purchase guide message related to the broadcast further includes transmitting, by the data server, a product purchase guide message related to the first broadcast to the first mobile terminal and the second mobile terminal.

In some embodiments, the method further includes receiving a notification cancellation request signal for the broadcast and a first mobile terminal information. The step of transmitting the product purchase guide message further includes transmitting, with the data server, the product purchase guide message to the second mobile terminal, and not transmitting the product purchase guide message to the first mobile terminal.

A non-transitory computer-readable recording medium on which a computer program for performing the above-described method is recorded.

A broadcast notification request generation system includes a data server configured to transmit a message to a mobile terminal, and a media providing server communicatively coupled to the data server via a network and connected to a set-top box. The media providing server is configured to receive a notification request signal for a broadcast and mobile terminal information from the set-top box, request the data server to transmit a product purchase guide message related to product information corresponding to the broadcast, and in response to receiving a notification request detail request signal and the mobile terminal information from the set-top box, generate and transmit resultant notification request signal information corresponding to the mobile terminal to the set-top box.

In some embodiments, with respect to a product related to the broadcast available for order within a broadcast time, the media providing server is further configured to receive an order request signal for the product and the mobile terminal information within the broadcast time.

In some embodiments, the media providing server is further configured to receive a notification cancellation request signal for the broadcast and the mobile terminal information. The data server does not transmit the product purchase guide message to the mobile terminal at a specified time.

In some embodiments, the product purchase guide message includes product information including a product name, broadcast date and time, and a product order link. The product order link is connected to a product order page.

In some embodiments, when the product is ordered using the product purchase guide message, the media providing server separately performs tagging on the generated order information.

In some embodiments, in response to receiving the notification request detail request signal and the mobile terminal information from the set-top box, the media providing server transmits, to the set-top box, the resultant notification request signal information in connection with the broadcast that is scheduled to be broadcast.

A method of generating a broadcast notification includes steps of displaying a selected broadcast content including a first user interface (UI) object on a display device, receiving, at a set-top box, a first user input selecting or activating the first UI object, upon receiving the first user input, displaying a second UI object that prompts a second user input for requesting mobile terminal information, upon receiving the second user input, or upon determination that the mobile terminal information is stored, displaying a third UI object that prompts a third user input for requesting permission to send a message using the mobile terminal information, transmitting, with the set-top box, the notification request signal, and the mobile terminal information to a data server, generating, with the data server, a customized notification message resulting from the selection or activation of the first UI object, and transmitting, to a selected mobile terminal associated with the mobile terminal information, the customized notification message.

In some embodiments, the method further includes displaying a fourth UI object that prompts a fourth user input for requesting cancellation to send the customized notification message using the mobile terminal information.

In some embodiments, the step of transmitting the customized notification message further includes transmitting the customized notification message in advance of a broadcast schedule or a live broadcast. The customized notification message further includes a notification of limited availability per the broadcast schedule or live broadcast.

In some embodiments, the step of displaying, on the display device, a fifth UI object that display a history of selection or activation of a set of customized notification messages sorted per the mobile terminal information and the method further includes prompting to change the selection or activation of the set of customized notification messages.

Other aspects, features and advantages other than those described above will become apparent from the following drawings, claims, and detailed description of the invention.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates a flowchart of processing notification request signal and related signals; and FIG. 4 illustrates a flowchart for the case where a broadcast notification request may be made.

FIG. 5 illustrates an example of a GUI in which a broadcast schedule for each date is displayed; and FIG. 6 illustrates a notification window stating that a notification request for a current broadcast is not possible.

FIG. 7 illustrates a UI object requesting a notification request for a broadcast scheduled to be broadcast for TV connected to a set-top box;

FIG. 8 illustrates a record of a user requesting a broadcast notification or ordering a product through the TV;

FIG. 9 illustrates a UI object requesting adding new mobile terminal information of a user who has no record;

FIG. 10 illustrates performing authentication for a mobile terminal;

FIG. 11 illustrates outputting an UI object to the TV; and

FIG. 12 illustrates an UI object for outputting a message indicating that a broadcast notification request is completed.

FIG. 13 illustrates an example of a GUI configuration of the TV;

FIG. 14 illustrates a screen for outputting the corresponding broadcast, product information, and notification request information; and FIG. 15 illustrates an UI object indicating that cancellation of the broadcast notification is completed.

FIGS. 16A to 18B are diagrams for explaining a method of managing a broadcast notification request for VOD broadcast according to an embodiment of the present disclosure, where:

FIG. 16A illustrates the entire screen of a TV displaying a notification request;

FIG. 18B illustrates an UI object for receiving a notification request for a broadcast that has ended.

FIGS. 19 to 21B are diagrams for explaining a method of managing a broadcast notification request for each user according to an embodiment of the present disclosure, where:

FIG. 19 illustrates a screen on which notification request details of a broadcast previously requested by a mobile terminal are output;

FIG. 20 illustrates selecting a specific notification request from among a plurality of notification requests;

FIG. 21B illustrates an UI object for indicating that the notification cancellation request is completed.

DETAILED DESCRIPTION

Figure 1:
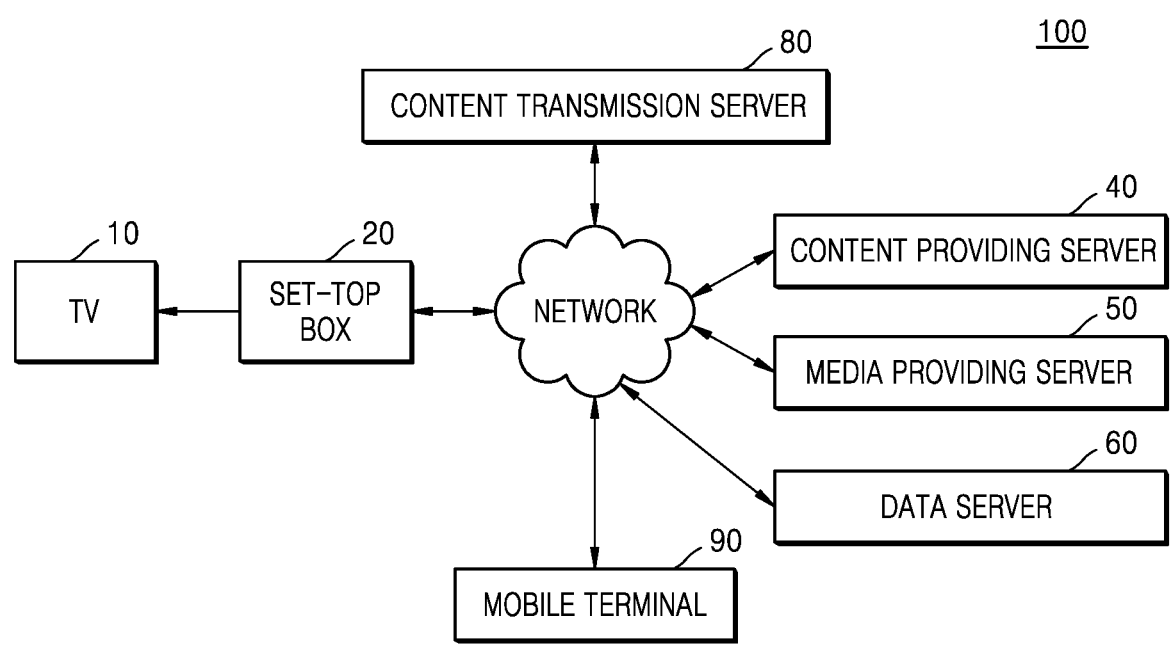
FIG. 1 is a diagram showing an example of the configuration of a broadcast notification request system according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure may apply various transformations and may have various embodiments, and thus specific embodiments may be illustrated in the drawings and described in detail in the detailed description. Effects and features of the present disclosure, and a method of achieving them, become apparent with reference to the embodiments described below in detail in conjunction with the drawings. However, the present disclosure is not limited to the embodiments disclosed below and may be implemented in various forms.

Hereinafter, embodiments of the present disclosure will be described in detail with reference to the accompanying drawings, and when described with reference to the drawings, the same or corresponding components are given the same reference numerals, and the overlapping description thereof will be omitted.

In the following embodiments, terms such as first, second, etc. are used for the purpose of distinguishing one component from another without limiting meaning.

In the following examples, the singular expression includes the plural expression unless the context clearly dictates otherwise.

In the following embodiments, terms such as include or have means that the features or components described in the specification are present, and the possibility that one or more other features or components may be added is not excluded in advance.

In the drawings, the size of the components may be exaggerated or reduced for convenience of description. For example, because the size and thickness of each component shown in the drawings are arbitrarily indicated for convenience of description, the present disclosure is not necessarily limited to what is shown.

In the following embodiments, when it is said that a part, such as a region, component, part, block, module, etc., is above or on another part, it includes not only a case where it is directly on of another part, but also a case where another region, component, part, block, module, etc. is interposed therebetween.

In the following embodiments, when a region, component, part, block, module, etc. is connected, this includes not only case where regions components, parts, blocks, modules, are directly connected, but also case where other regions, components, parts, blocks, modules are interposed therebetween to be indirectly connected. Hereinafter, 'app' may represent 'application'.

FIG. 1 is a diagram showing an example of the configuration of a mobile terminal-based broadcast notification request system 100 according to an embodiment of the present disclosure.

Referring to FIG. 1, the mobile terminal-based broadcast notification request system 100 may include a content providing server 40, a media providing server 50, and a data server 60.

The mobile terminal-based broadcast notification request system 100 may communicate with a set-top box 20 and/or a TV 10 connected to the set-top box 20 through a network. Of course, the components of the mobile terminal-based broadcast notification request system 100 may be connected to each other through the network to communicate with each other. For example, the content providing server 40, the media providing server 50, the data server 60, and/or a content transmission server 80 may be connected to each other through the network to communicate with each other.

However, the present disclosure is not limited thereto, and the system 100 may further include other components or some components may be omitted. Some components of the system 100 may be separated into a plurality of devices or may be combined into one device.

The set-top box 20 is a hardware device for viewing satellite broadcasting or cable broadcasting at home. Data such as satellite broadcasting, cable broadcasting, or Internet broadcasting is transmitted to the set-top box 20 as data processed through compression and modulation. The set-top box 20 may perform demodulation and decompression processing on the received data to be implemented in a terminal such as the TV 10. According to an embodiment, the set-top box 20 may receive a broadcast image from the content transmission server 80. This set-top box 20 may have a unique set-top ID. That is, each of the set-top boxes 20 provided in the user's houses may have the unique set-top ID. The set-top ID may include, for example, numbers, characters such as alphabets, special characters and/or symbols, and the like. The set-top box 20 may receive a user input signal from an external input/output device (e.g., a remote controller) through an input/output interface. In some forms, the set-top box 20 may receive a mobile phone number of the mobile terminal 90 through the input/output device.

The set-top box 20 may receive identification values for a plurality of mobile terminals from a plurality of users through the input/output device. The identification value of the mobile terminal may be, for example, a mobile phone number.

In an embodiment, the set-top box 20 may transmit broadcast notification request information for each user and set-top box information to the media providing server 50 and/or the data server 60 through the network.

In another embodiment, the set-top box 20 may receive a broadcast notification request detail for each user through the network from the media providing server 50 and/or the data server 60.

In another embodiment, the data server 60 may send a product purchase guidance message to a mobile terminal 90.

On the other hand, the set-top box 20 may transmit data to be displayed to the TV 10.

Here, the TV 10 may be a conventional TV, or may be a monitor. That is, an electronic device capable of displaying a user-recognizable screen may be called the TV 10.

In some forms, the content transmission server 80 is not included in the mobile terminal-based broadcast notification request system 100. The content transmission server 80 may be, for example, a server of a broadcast provider. In other forms, as described above, the mobile terminal-based broadcasting notification request system 100 may include the content transmission server 80. In this case, the content transmission server 80 may transmit the content to the servers of various broadcasting providers. Such a content transmission server 80 may store content such as broadcasting images for the platform or format of the broadcasting provider. The content transmission server 80 may transmit the stored content to the set-top box 20 described above to allow the contents such as broadcast images to be played on the TV 10.

The content transmission server 80 may receive data of content, such as a broadcast image, from the content providing server 40 through other transmission paths such as a network, for example, distributed network or contents delivery network (CDN).

The content providing server 40 may register (e.g., obtain and store) content such as a commerce video to be provided through the broadcast notification request system 100 according to an embodiment of the present disclosure. In addition, the content providing server 40 may receive meta information of the content (such as a video) from the data server 60 and match the meta information for each content. To this end, the content providing server 40 may be connected to the data server 60, and may exchange various information with each other through communication. The meta information may include product information, production information, and/or review information related to the corresponding content. In some cases, the content providing server 40 may directly receive and store the meta information from a content provider.

The content providing server 40 may convert registered content to conform to each platform or format and transmit it to the content transmission server 80. The present disclosure is not limited thereto. The content providing server 40 may store the content and transmit it to the content transmission server 80, and the content transmission server 80 may convert and store the content to conform to the platform or format.

As described above, the content providing server 40 may transmit content data (such as a video) or converted content data to the content transmission server 80 through the distributed network or CDN. Further, the content providing server 40 may receive image identification information of each video from the content transmission server 80. The image identification information may be, for example, URL information of the content stored in the content transmission server 80. The content providing server 40 may transmit such image identification information on the registered video to the data server 60.

The data server 60 may receive image identification information on the video from the content providing server 40. The data server 60 may be a computing device in which a server program such as Apache Tomcat® or Oracle is installed, and may be implemented to function as a server. The data server 60 may store meta information including product information, production information, and/or review information of the content as described above. In addition, the data server 60 may store image identification information, or the like, and provide related information to the media providing server 50 in response to the request of the media providing server 50.

In addition, the data server 60 may store image identification information, pop-up data, or the like, and provide related information to the media providing server 50 in response to a request of the media providing server 50. In this case, the image identification information may be used to call a broadcast image stored in the content transmission server. The image identification information may be, for example, playback URL information stored in the content transmission server 80. The set-top box 20 may read the image identification information included in the output data received from the media providing server 50 to receive the broadcast image from the contents transmission server 80. In this case, the set-top box 20 may receive the broadcast image from the content transmission server 80 without going through the media providing server 50 and the data server 60.

According to one embodiment of the present disclosure, the data server 60 may store and manage information about the display of the mobile terminal-based broadcast request application. That is, the data server 60 may include an administration server. According to another embodiment, the management server may be a device which is separate from the data server 60.

On the other hand, the set-top box 20 may transmit, for example, data on a user input obtained through a remote control or the like to the media providing server 50 to receive image identification information of content such as a broadcast image corresponding to the user input from the media providing server 50, and may request broadcast image data (e.g., video on demand (VOD) data) corresponding to the image identification information to the content transmission server 80. According to one embodiment, the set-top box 20 may convert a subscriber's request (e.g., a user input through a remote control) into a control signal and transmit the control signal to the media providing server 50.

The media providing server 50 may drive and control an application based on the control signal transmitted from the set-top box 20. The media providing server 50 may receive product information, customer information, order information, programming information, and/or image identification information from the data server 60 which is external thereto. Also, the media providing server 50 may generate application screen data for the application. The application screen data is data for the application screen to implement (for example, display) on screen of the TV 10. The media providing server 50 may transmit the generated application screen data to the set-top box 20. For example, the media providing server 50 may transmit the generated application screen data and image identification information (e.g., URL information) corresponding to the user's control signal to the set-top box 20 together. The media providing server 50 may be, for example, a cloud server, but the present disclosure is not limited thereto.

Through the process of transmitting the image identification information as described above, the commerce contents registered in the content providing server 40 may be provided to subscribers as VOD. For example, a subscriber may select and watch various videos by transmitting the user input to the set-top box 20, based on an application or an application screen driven by the media providing server 50.

The set-top box 20 may receive data of contents such as broadcast images from the content transmission server 80 based on communicating with the media providing server 50. The set-top box 20 may obtain a broadcast image and/or VOD data from the content transmission server 80 by using the image identification information received from the media providing server 50. The set-top box 20 may transmit content such as the obtained broadcast image and/or VOD data to the TV 10 to be output. For example, the set-top box 20 may generate output data for broadcasting to be output through the TV 10 based on data received from the content transmission server 80 and the media providing server 50.

According to one embodiment, the set-top box 20 may receive the application screen data from the media providing server 50 through other transmission paths such as a network. In addition, the set-top box 20 may receive broadcast image (video content) data from the content transmission server 80 through an image transmission path on a network, so that the selected broadcast image is played on the TV 10 screen. The set-top box 20 may obtain a user input regarding a channel and/or a product code through a remote control communicating therewith.

On the other hand, the set-top box 20 may process output data for broadcasting through a program installed in the set-top box 20. The set-top box 20 may read a platform code, an STP ID, access information, and the like of the set-top box 20 and generate output data based thereon. The set-top box 20 may output such output data from an external output device, for example, the TV 10.

The TV 10 is a terminal connected to the set-top box 20, and may receive and output the output data processed and/or generated in the set-top box 20. For example, the TV 10 may display a screen depending on a screen data and output a voice depending on an audio data. The TV 10 may be directly connected to the set-top box 20 through a cable or the like. However, the present disclosure is not limited thereto, and the TV 10 may be directly connected to the network, or in this case, may be connected to the set-top box 20 through the network if necessary.

The network may be defined as one or more data links capable of transmitting and receiving data between electronic devices and/or servers, and may be a wired and/or wireless communication network. For example, the network may include a CDN capable of efficiently delivering a variety of user-selectable content. Alternatively, the network may be the Internet, Wi-Fi, Bluetooth, Bluetooth Low Energy, Zigbee, or ultra-wide band (UWB), but the network in the present disclosure is not limited thereto.

As described above, a mobile terminal-based broadcasting notification request system 100 according to an embodiment of the present disclosure may generate application screen data using at least one of the content providing server 40 communicating with the set-top box 20, the media providing server 50, and the data server 60, thereby distributing the load on the network and rapidly realizing broadcasting including various information substantially in real time.

Figure 2:
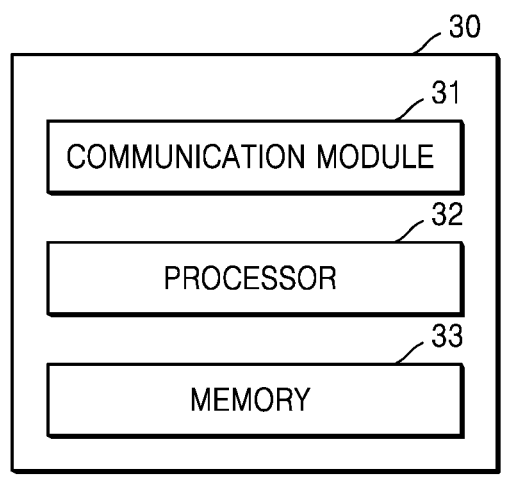
FIG. 2 is a block diagram schematically illustrating a partial configuration of a device included in a broadcast notification request system according to an embodiment of the present disclosure.

FIG. 2 shows in detail a partial configuration of a mobile terminal-based broadcasting notification request device 30 included in the mobile terminal-based broadcast notification request system 100 according to an embodiment of the present disclosure. The mobile terminal-based broadcasting notification request device 30 shown in FIG. 2 may be implemented with or in the content providing server 40, the media providing server 50, or the data server 60. Alternatively, the mobile terminal-based broadcast notification request device 30 shown in FIG. 2 may be implemented with or in the set-top box 20 or the content transmission server 80 as described above. The mobile terminal-based broadcast notification request device 30 (hereinafter referred to as device 30) may include a communication module 31, a processor 32, and a memory 33.

The communication module 31 may communicate with various types of external devices and servers based on various types of communication methods. The communication module 31 of one device 30 may be connected to the communication module 31 of another device 30 through a network to exchange data with each other.

The processor 32 may use various programs stored in the memory 33 to perform an overall control operation for each device 30 or the server 40, 50, 60, and 80 having each memory. The processor 32 may include a processing device such as a microprocessor, a central processing unit (CPU), a processor core, a multiprocessor, an application-specific integrated circuit (ASIC), and a field programmable gate array (FPGA), but is not limited thereto.

The memory 33 may temporarily or permanently store data processed by each device 30 or the server 40, 50, 60, and 80 having each memory. The memory 33 may include a random access memory (RAM), a read only memory (ROM), and a permanent mass storage device such as a disk drive, but the present disclosure is not limited thereto.

The device 30 may further include a storage medium (not shown) storing various data for overall operations, such as a program for processing or controlling the processor 32. The storage medium may store a plurality of application programs or applications driven in the device 30, data for operation of the servers 40, 50, 60, and 80, and instructions. At least some of these application programs may be downloaded from an external server through wireless communication. In addition, at least some of these applications may be on the device 30 from the time of release for the basic function of the device 30. The application program may be stored in a storage medium and driven by the processor 32 to perform an operation (or function) of the device 30.

Figure 3:
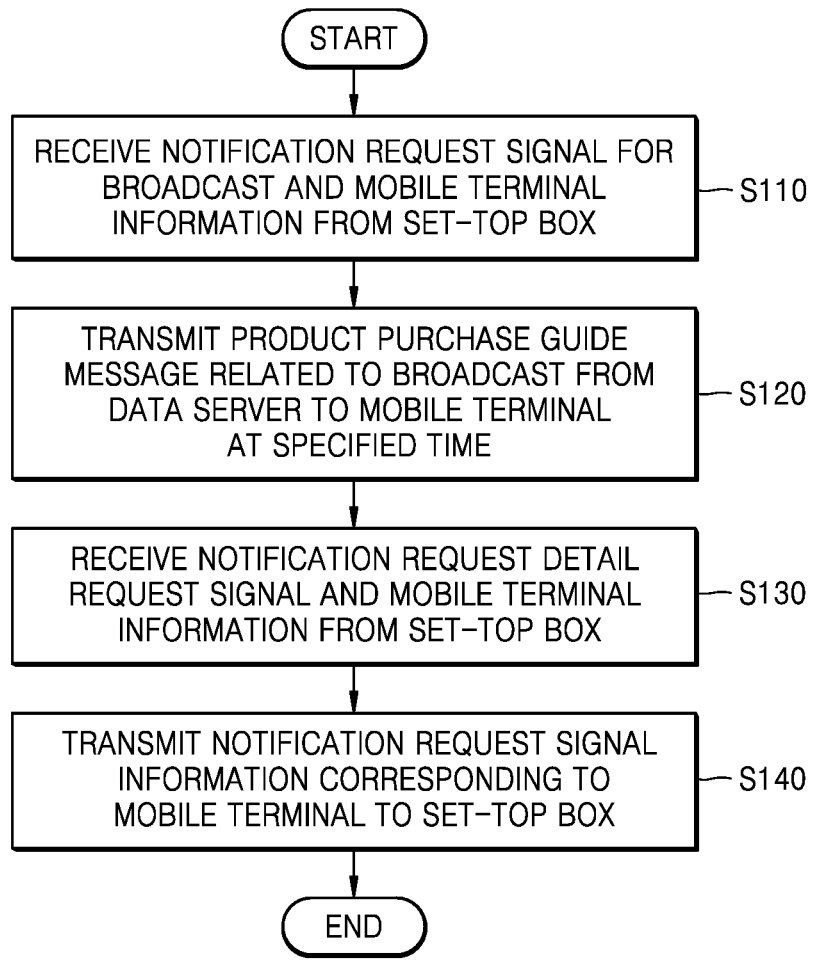
FIGS. 3 and 4 are flowcharts illustrating a method of requesting a broadcast notification according to an embodiment of the present disclosure, where.
Figure 4:
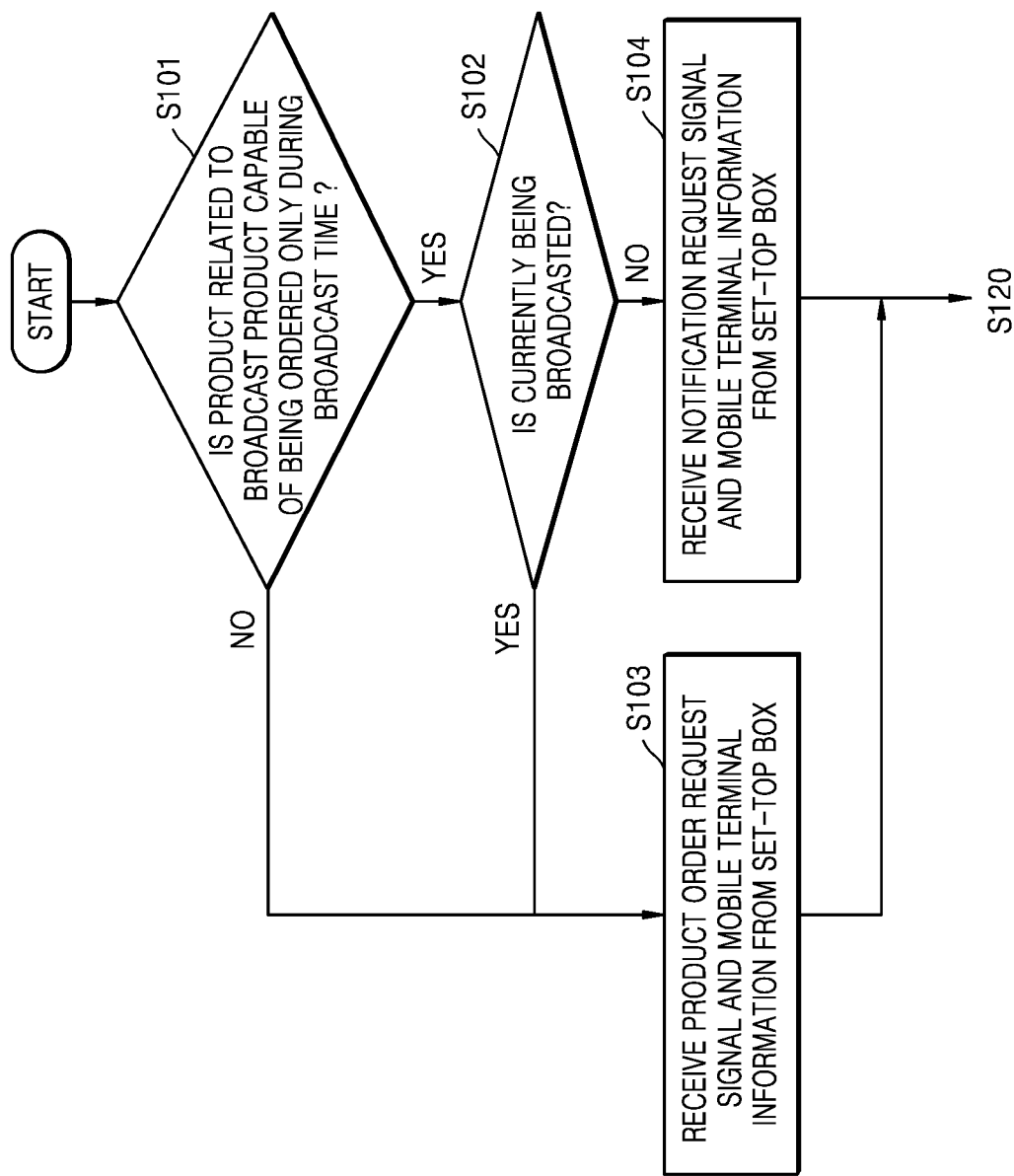

FIGS. 3 and 4 are flowcharts illustrating a method of requesting a broadcast notification according to an embodiment of the present disclosure.

When referring to FIG. 3, in the method of requesting a broadcast notification according to an embodiment, first, in step S110, a notification request signal for a broadcast and mobile terminal information may be received from a set-top box through a network.

Thereafter, in step S120, a data server may transmit a product purchase guide message related to the broadcast to a mobile terminal through the network.

In one embodiment, the product purchase guide message may include product information including at least one of a product name, a broadcast date and time, and a product order link, and the product order link may be connected to a product order page.

In another embodiment, the product order link may be linked to a login page, and may be linked to a product order page after logging in.

According to some embodiments of the present disclosure, a plurality of users may use a single set-top box. According to the present embodiment, a notification request signal for a first broadcast and the first mobile terminal information may be received from a set-top box connected to a specific mobile terminal, and the notification request signal for the first broadcast and the second mobile terminal information may also be received therefrom. In this case, the data server may transmit a product purchase guide message related to the first broadcast to the first mobile terminal and the second mobile terminal.

According to another embodiment, the data server may receive a notification cancellation request signal for broadcasting and mobile terminal information from a set-top box connected to the media providing server through a network. In this case, the data server may not send a product purchase guide message to the mobile terminal.

For example, as described above, it is assumed that the media providing server and/or the data server receive the notification request signal for the first broadcast and the first mobile terminal information from the set-top box through the network, and receive the notification request signal for the first broadcast and the second mobile terminal information therefrom.

In this embodiment, when the media providing server and/or the data server receives the notification cancellation request signal for broadcasting and the first mobile terminal information through the network, the media providing server and/or the data server may cancel only the notification request signal corresponding to the first mobile terminal. In other words, the data server may transmit the product purchase guide message to the second mobile terminal, and does not transmit the product purchase guide message to the first mobile terminal.

In addition, in some embodiments, the time at which the data server transmits the product purchase guide message to the mobile terminal may be designated in advance by the media providing server and/or the data server. For example, a product purchase guide message may be transmitted to the mobile terminal thirty (30) minutes before the start of the broadcast. A more specific description will be described later in the following related drawings.

In step S130, a notification request detail request signal and mobile terminal information may be received from the set-top box. Then, in step S140, the notification request signal information corresponding to the mobile terminal may be transmitted to the set-top box. That is, the media providing server and/or the data server may transmit information on the notification request detail previously requested by the corresponding user to the set-top box by using the mobile terminal information.

Meanwhile, in other embodiments, the media providing server and/or the data server may transmit, to the set-top box, a notification request signal for the broadcast in which broadcast has not started. In this embodiment, in response to receiving a notification request detail request signal and mobile terminal information from the set-top box, the media providing server and/or the data server may transmit to the set-top box a notification request signal for a broadcast that is not yet broadcasted among the notification request signals corresponding to the mobile terminal.

In some embodiments, the notification request signal information transmitted from the media providing server and/or the data server to the set-top box may include a plurality of notification request signals. In this case, when receiving a cancellation request signal for a specific notification request signal among a plurality of notification request signals from the set-top box, the media providing server and/or the data server may not transmit the specific notification request signal relevant to the cancellation request signal.

In addition, according to another embodiment of the present disclosure, when a product is ordered using the product purchase guide message transmitted by the server to the mobile terminal, tagging may be separately performed on the generated order information. Through the tagging operation, product order information ordered through a separate channel and product order information ordered through the above-described product purchase guide message may be separately managed.

FIG. 4 illustrates a flow chart for the case where a broadcast notification request may be made according to an embodiment of the present disclosure.

The media providing server may receive a notification request signal for a specific broadcast and/or an order request signal from the set-top box. In some forms, the media providing server may receive the notification request signal for the broadcast before a specific broadcast schedule. Additionally, or alternatively, the media providing server may receive an order request signal for a product related the broadcast during the broadcast time. Alternatively, in other embodiment, the media providing server may receive an order request signal for a selected product related to the broadcast, regardless of the broadcast time. Hereinafter, steps S101 to S102 are described in more detail.

In step S101, it may be determined whether the product related to the broadcast limited to be ordered during the broadcast time. The media providing server may perform step S102 when the product related to the broadcast is a product capable of being ordered during the broadcast time in an embodiment, and if not, proceeds to step S103, as the product sold through the broadcast is available for order, regardless of the broadcast time.

In step S102, the media providing server may check whether the corresponding broadcast is currently being broadcasted. In some forms, when the broadcast is currently being broadcasted, the media providing server proceeds to step S103. Alternatively, when the broadcast is not currently being broadcasted, step S104 may be performed.

In step S103, the order request signal for the product from the set-top box and the mobile terminal information is received. Specifically, with respect to products available for order, regardless of the broadcast time, the media providing server may receive a product order signal from the user regardless of the broadcast time. Alternatively, for products available for order while being the broadcast, the media providing server may receive the product order signal from a user during the broadcast.

In step S104, the media providing server may receive the notification request signal and the mobile terminal information from the set-top box. In this case, for products available for order during the broadcast, the media providing server may receive a notification request signal for the broadcast, instead of a product order request signal from the user, when the product is not currently being broadcasted.

Hereinafter, a GUI output to a TV connected to a set-top box performing a broadcast notification request method according to some embodiments of the present disclosure will be described with reference to FIGS. 5 to 21.

Figure 5:
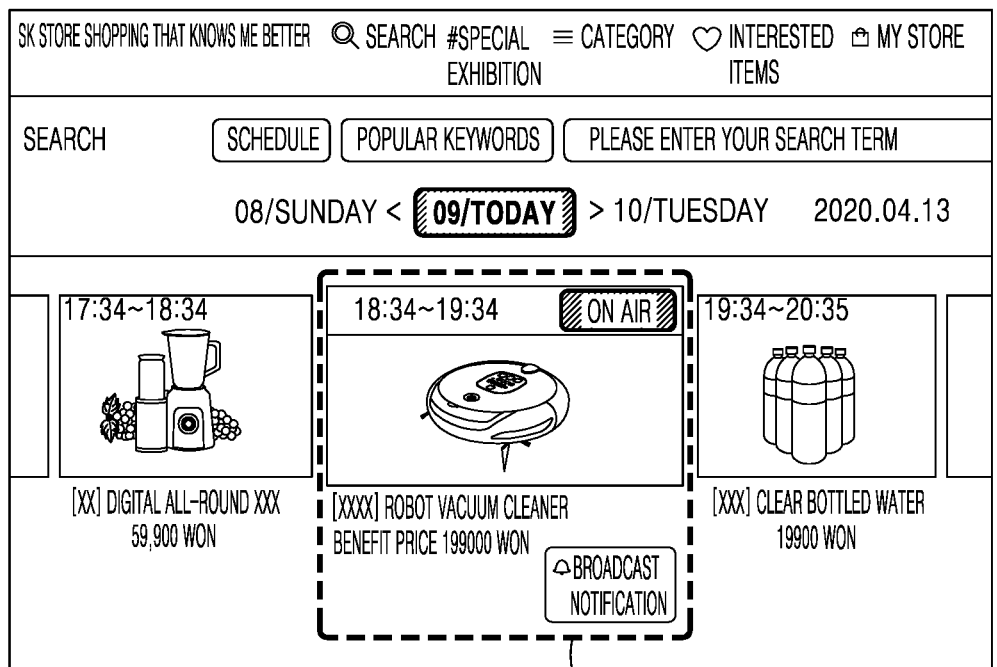
FIGS. 5 and 6 are diagrams for explaining a method of managing a notification request for a broadcast that is being broadcasted according to an embodiment of the present disclosure, where.
Figure 6:
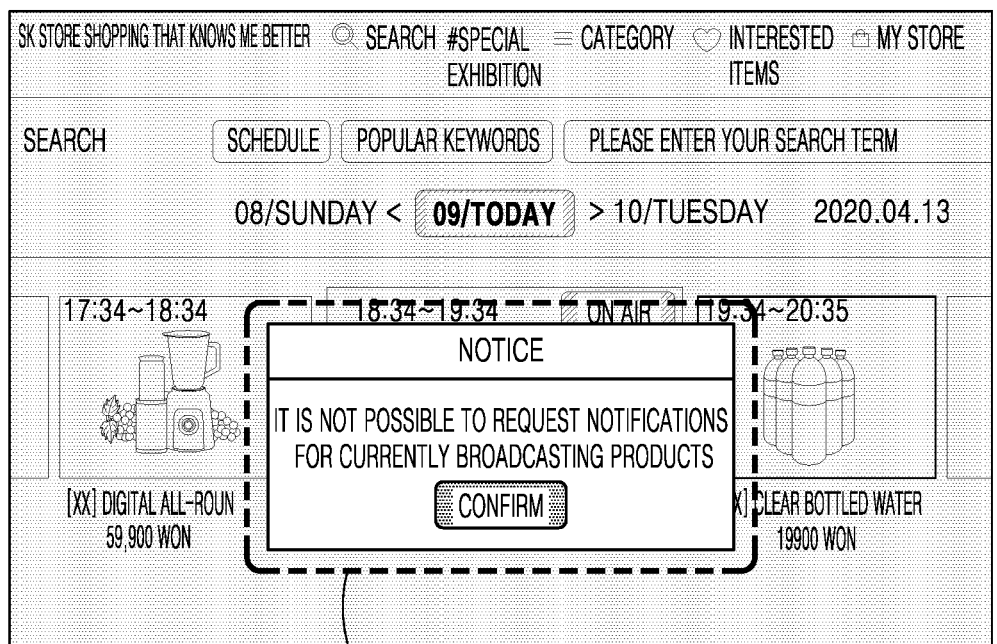

FIGS. 5 and 6 are diagrams for explaining a method for managing a notification request for a broadcast that is being broadcasted according to one or more embodiments of the present disclosure. More specifically, FIG. 5 illustrates an example of a GUI in which a broadcast schedule for each date is displayed and FIG. 6 illustrates a notification window stating that a notification request for a current broadcast is not possible.

FIG. 5 shows an example of a GUI in which a broadcast schedule for each date is displayed. According to an embodiment of the present disclosure, the media providing server 50 may receive a notification request signal for a broadcast that is not yet being broadcasted. Therefore, even if the TV 10 connected to the set-top box receives a user input for a UI object 201 requesting a notification request for a broadcast currently being broadcasted, as shown in FIG. 6, a notification window 202 stating that a notification request for a currently broadcasting broadcast is not possible may be output.

Figure 7:
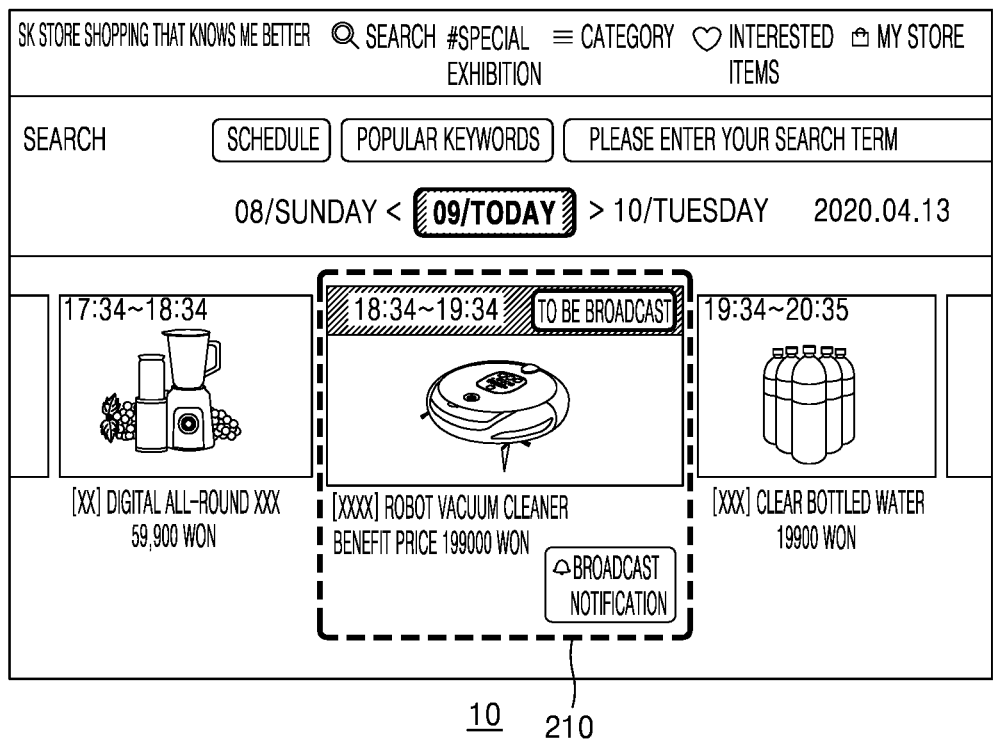
FIGS. 7 to 12 are diagrams for explaining a method of managing a notification request for a broadcast that is not being broadcasted according to an embodiment of the present disclosure, where.
Figure 8:
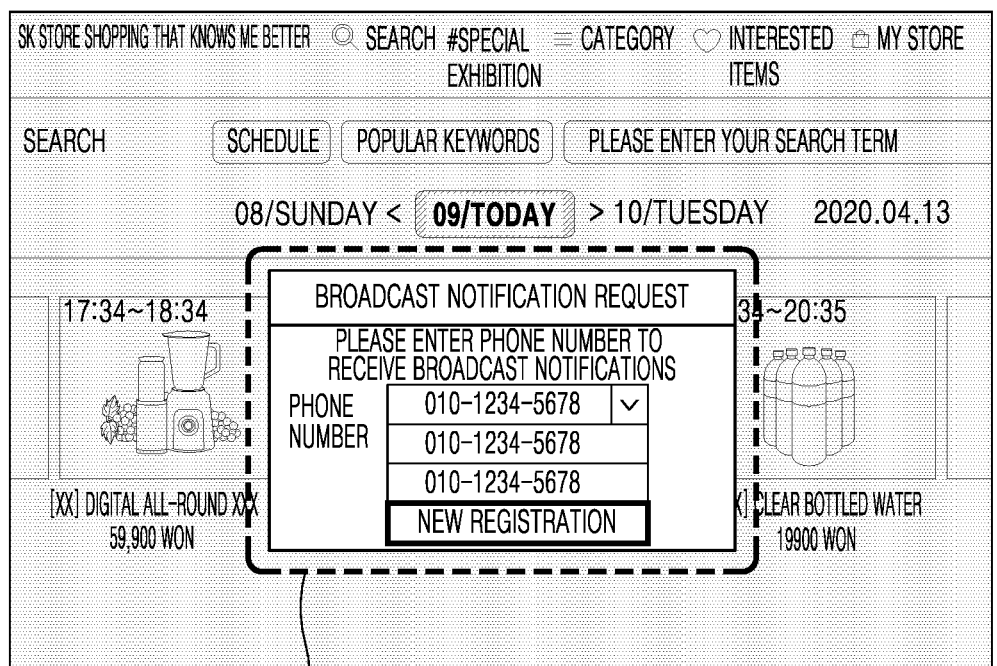
Figure 9:
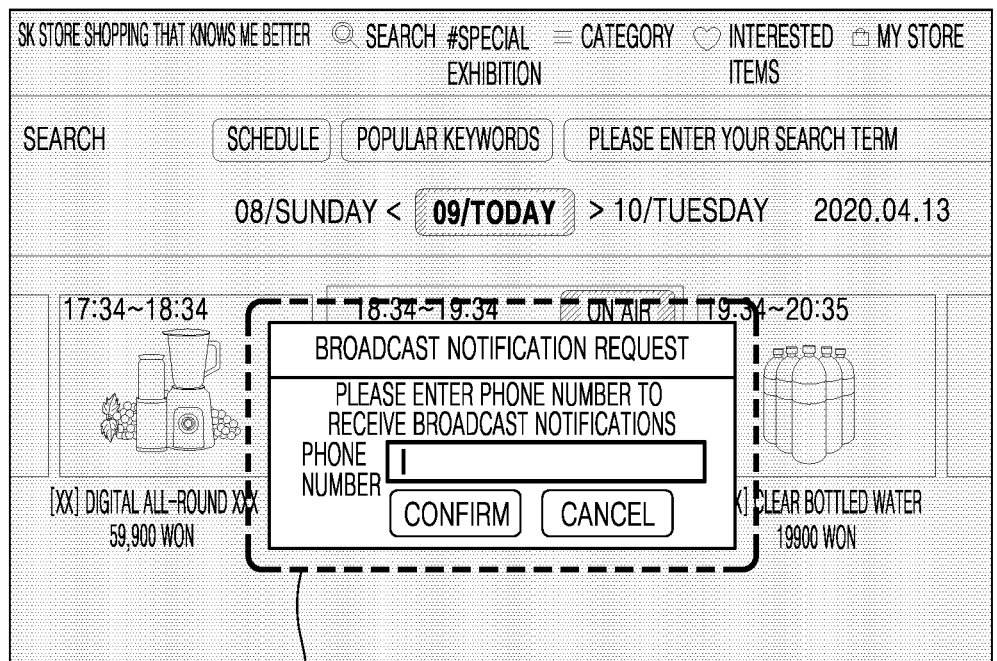
Figure 10:
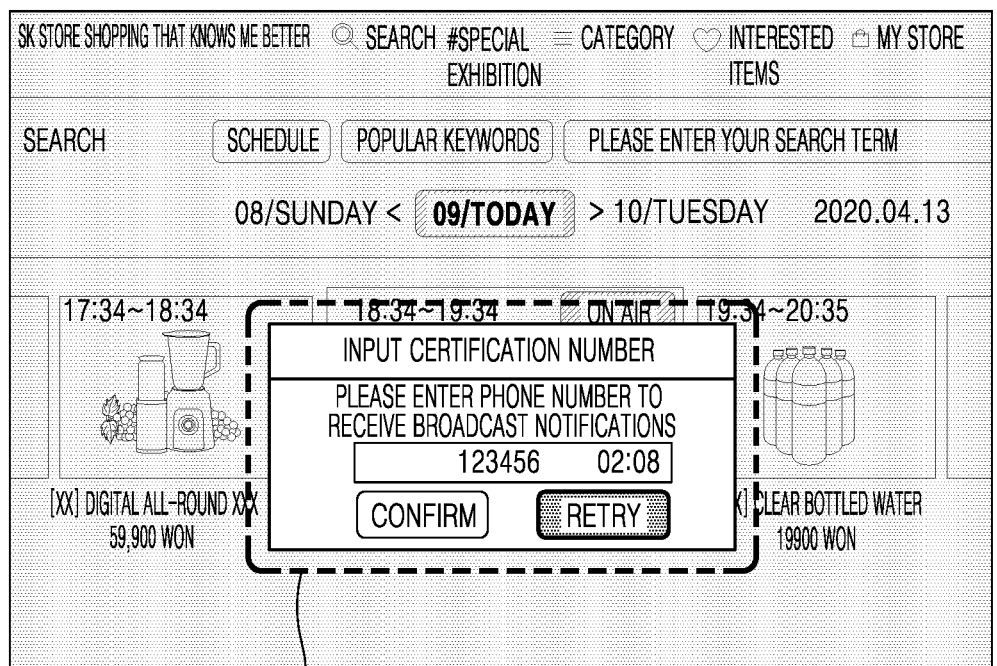
Figure 11:
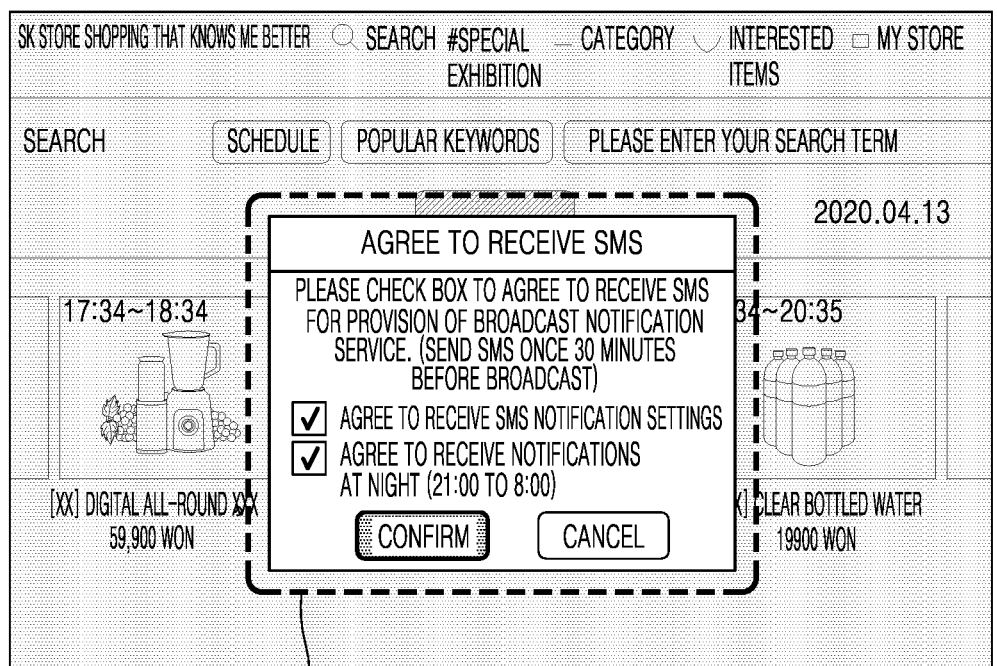
Figure 12:
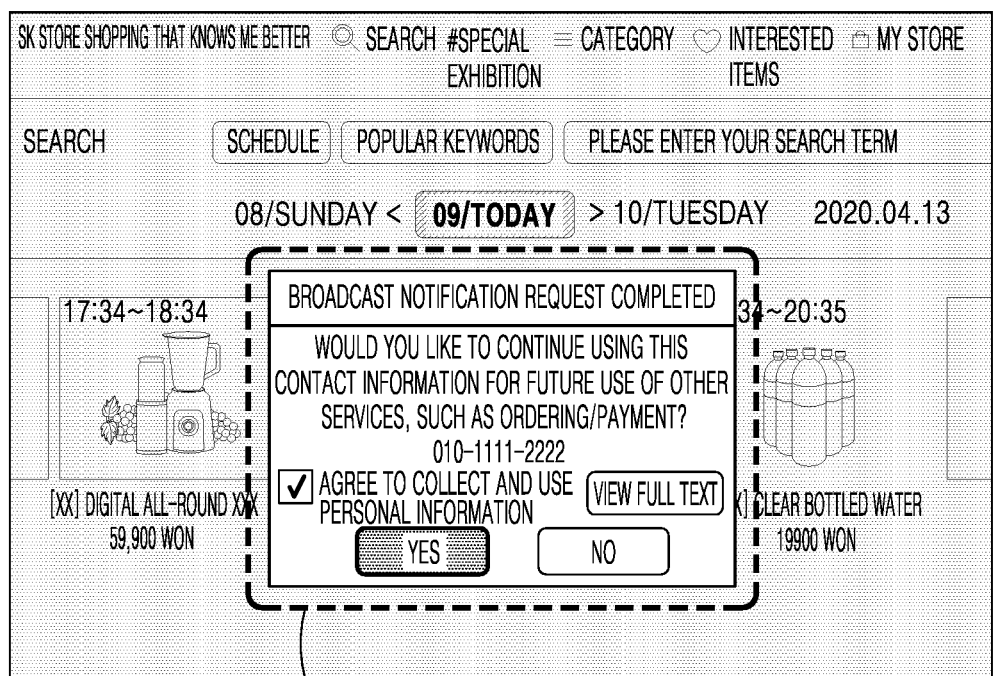

Hereinafter, examples where a media providing server receives a notification request signal for a broadcast before starting a broadcast according to some embodiments of the present disclosure is described in detail with reference to FIGS. 7 to 12. More specifically, FIG. 7 illustrates a UI object requesting a notification request for a broadcast scheduled to be broadcast for TV connected to a set-top box. FIG. 8 illustrates a record of a user requesting a broadcast notification or ordering a product through the TV. FIG. 9 illustrates a UI object requesting adding new mobile terminal information of a user who has no record. FIG. 10 illustrates performing authentication for a mobile terminal. FIG. 11 illustrates outputting an UI object to the TV. FIG. 12 illustrates an UI object for outputting a message indicating that a broadcast notification request is completed.

A user input is received via the UI object 210 requesting a notification request for a broadcast scheduled to be broadcast to the TV 10 connected to the set-top box, as shown in FIG. 8. Upon receiving the user input the media providing server 50 (e.g., as shown in FIG. 1) may request mobile terminal information for the user identification from the set-top box.

Several users may share the TV 10. In that case, broadcast notification requests and product order requests may be independently managed for each user. Therefore, the user may input mobile terminal information capable of user identification through the input/output device of the TV 10. The type and form of data included in the mobile terminal information is not limited. For example, the mobile terminal information may be a mobile phone number, a mobile phone unique number, a user ID, or user identification information.

For example, as shown in FIG. 8, when there is a record of a user requesting a broadcast notification or ordering a product through the TV 10, the mobile terminal information of the user may be stored in a designated list 211. On the other hand, when there is no record of the user inputting the mobile terminal information to the TV 10, the mobile terminal information may be newly added through the UI object 212 shown in FIG. 9.

On the other hand, when referring to FIG. 10, the media providing server 50 may additionally perform authentication 213 for the mobile terminal in order to improve security.

Also, prior to sending the product information message from the data server to the mobile terminal, a UI object 214 may be output to the TV 10 to confirm whether the user agrees to receive an SMS transmission and a night (e.g., 21:00 to 08:00) notification, as shown in FIG. 11.

Thereafter, the above-described set-top box connected to the TV 10 may transmit the notification request signal for the broadcast and the mobile terminal information to the media providing server. Also, the UI object 215 for outputting a message indicating that the broadcast notification request is completed may be output to the TV 10 connected to the corresponding set-top box, as shown in FIG. 12.

Figure 13:
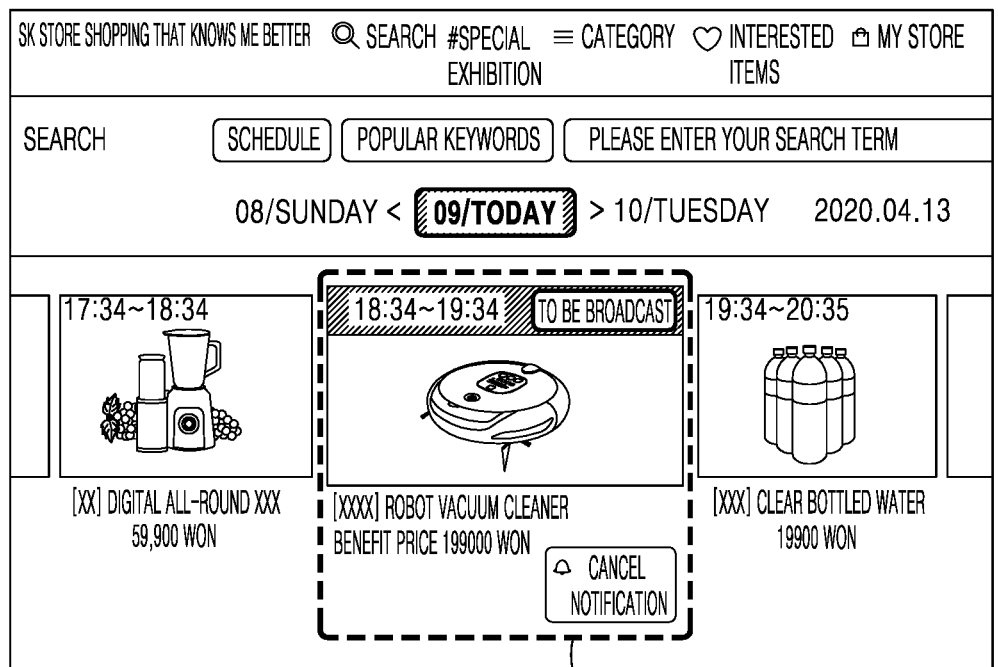
FIGS. 13 to 15 are diagrams for explaining a method of canceling a broadcast notification request according to an embodiment of the present disclosure, where.
Figure 14:
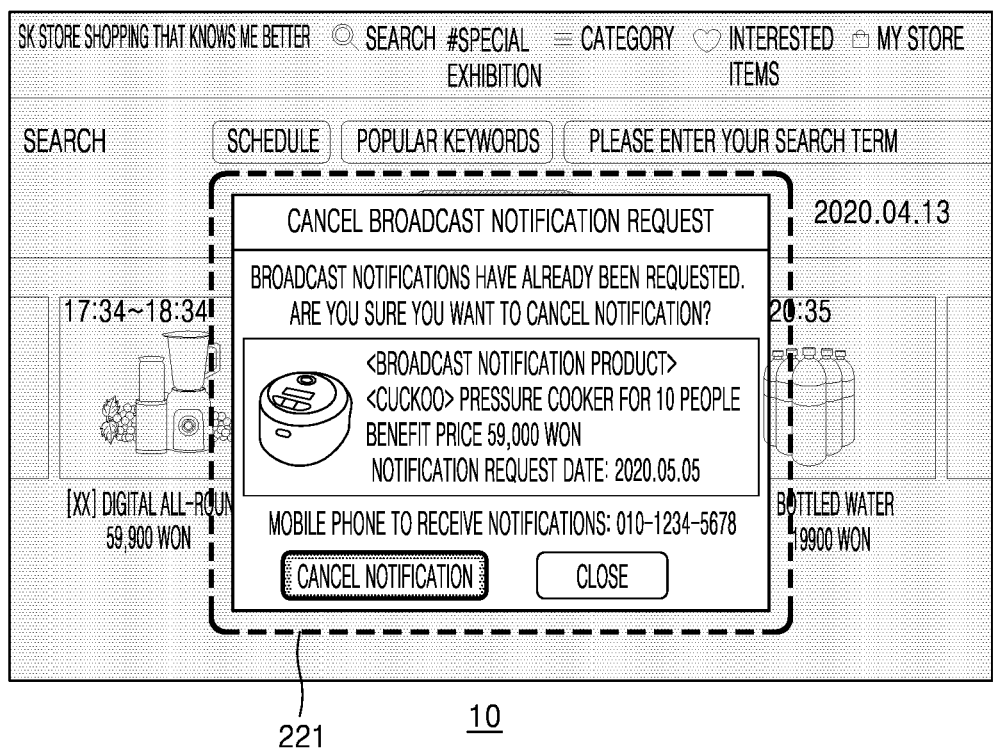
Figure 15:
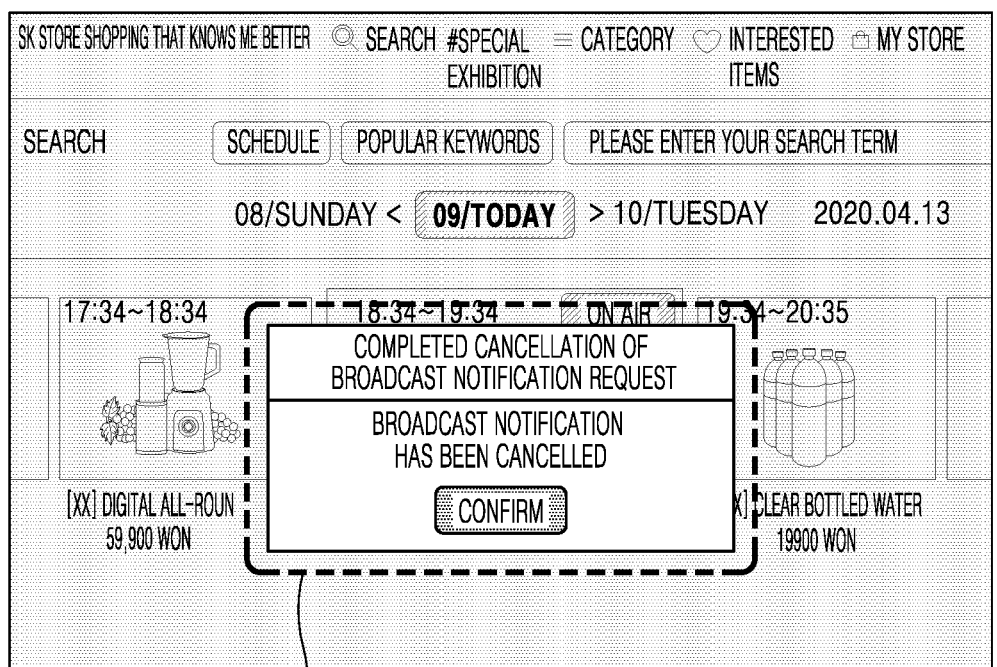

The media providing server 50 may receive a notification cancellation request signal and the mobile terminal information from the set-top box. FIGS. 13 to 15 show an example of a GUI configuration of the TV 10 for canceling the broadcast notification request according to an embodiment of the present disclosure. FIG. 13 illustrates an example of a GUI configuration of the TV. FIG. 14 illustrates a screen for outputting the corresponding broadcast, product information, and notification request information. FIG. 15 illustrates an UI object indicating that cancellation of the broadcast notification is completed.

In one embodiment, the notification cancellation request may primarily be performed before the corresponding broadcast starts. For example, in FIG. 13, the GUI configuration of the TV 10 on which the broadcast schedule of a specific date is output is shown, and when a broadcast notification request for a broadcast that has not yet been broadcast has already been performed, a UI object 220 for canceling the aforementioned broadcast notification request may be shown on the TV 10.

When the TV 10 receives a user input for the UI object 220 for canceling the broadcast notification request, a screen 221 for outputting the corresponding broadcast, product information related to the broadcast, and notification request information may be output to the TV 10, as shown in FIG. 14. In some embodiments, when the user selects the confirmation UI object for canceling the notification request, the UI object 222 indicating that the cancellation of the broadcast notification is completed may be further output to the TV 10 as shown in FIG. 15. Then, the set-top box connected to the TV 10 may transmit the notification cancellation request signal and mobile terminal information of the corresponding user to the media providing server 50.

Meanwhile, it should be noted that the above-described GUI configuration of FIGS. 5 to 15 is only an example, and the GUI configuration for requesting a notification for broadcasting or canceling a notification according to some embodiments of the present disclosure is not limited thereto. FIGS. 16A to 18B are diagrams for explaining a method of managing a broadcast notification request for Video On Demand (VOD) broadcast according to an embodiment of the present disclosure.

Figure 16A:
Figure 16B:
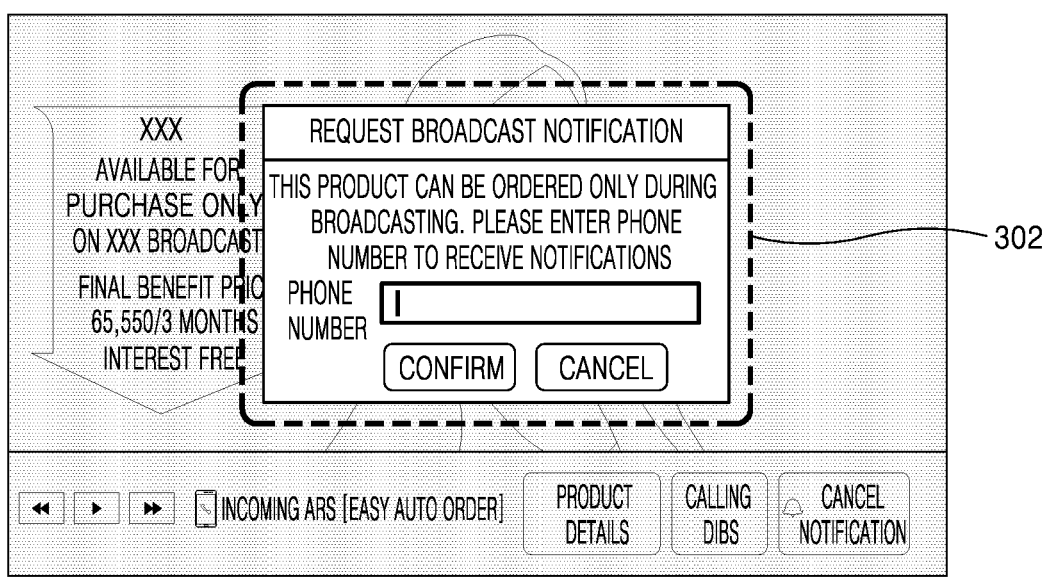
FIG. 16B illustrates an UI object for requesting mobile terminal information.
Figure 17A:
FIG. 17A illustrates an UI object for cancelling the notification request.
Figure 17B:
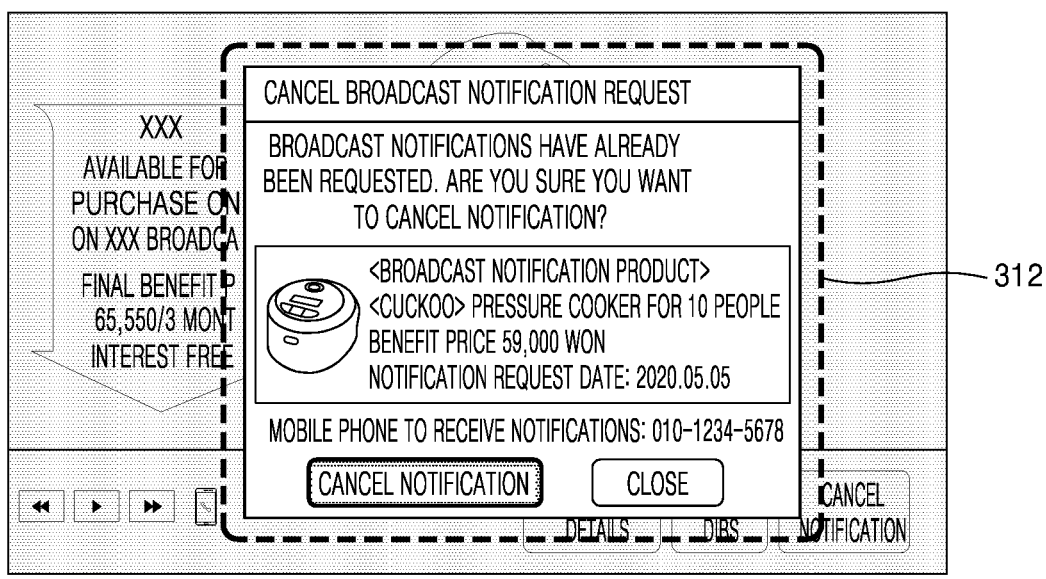
FIG. 17B illustrates an UI object in which pre-stored notification request information and broadcast-related information are displayed.
Figure 18A:
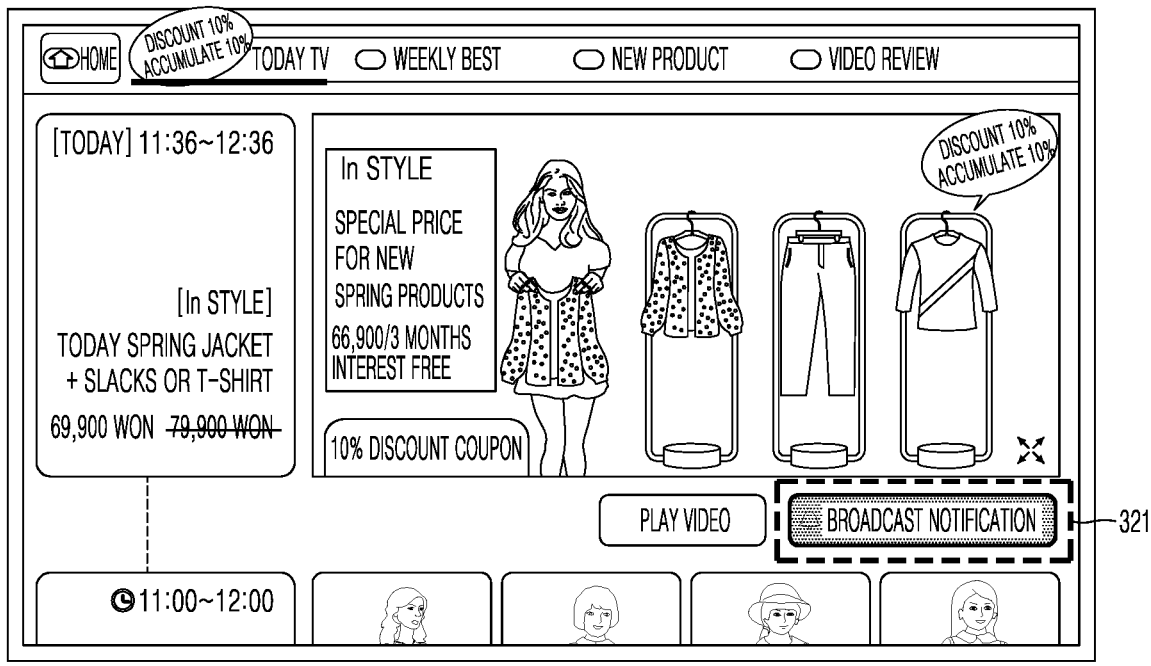
FIG. 18A illustrates an UI object for receiving a notification request for an already ended broadcast image.
Figure 18B:

More specifically, FIG. 16A illustrates the entire screen of a TV displaying a notification request. FIG. 16B illustrates an UI object for requesting mobile terminal information. FIG. 17A illustrates an UI object for cancelling the notification request. FIG. 17B illustrates an UI object in which pre-stored notification request information and broadcast-related information are displayed. FIG. 18A illustrates an UI object for receiving a notification request for an already ended broadcast image. FIG. 18B illustrates an UI object for receiving a notification request for a broadcast that has ended.

According to some embodiments of the present disclosure, a UI object 301 for broadcasting notification request may be provided in various forms. For example, when referring to FIG. 16A, even when a specific broadcast image is output on the entire screen of the TV 10, the UI object 301 for requesting a notification for a corresponding broadcast may be output. Thereafter, as shown in FIG. 16B, the TV 10 may further output a UI object 302 for requesting mobile terminal information in response to receiving a user input for the UI object 301 for requesting a broadcast notification.

As described above, the mobile terminal information received to the set-top box through the TV 10 may be transmitted to the media providing server 50 and/or the data server 60 (see FIG. 1) through the set-top box 20. Also, the data server 60 may transmit a product purchase guide message for notifying the next schedule of the corresponding broadcast or the live broadcast schedule to the mobile terminal.

Further, while a specific broadcast image is output on the entire screen of the TV 10, a notification request signal may have already been set for the corresponding broadcast. Then, a UI object 311 for canceling the notification request may be output, as shown in FIG. 17A. Thereafter, in response to receiving a user input for the UI object 311 for a notification cancellation request of a broadcast, the TV 10 may further output a UI object 312 in which pre-stored notification request information and broadcast-related information are displayed to confirm notification cancellation request, as shown in FIG. 17B.

According to some embodiments of the present disclosure, the GUI configuration for the set-top box to receive a notification request signal and notification cancellation request for a specific broadcast through the TV 10 is not limited thereto, and the format of the specific broadcast described above is also not limited thereto. In one embodiment, the broadcast image output to the TV 10 may be an image transmitted in real time or a pre-stored VOD image.

According to an embodiment of the present disclosure, a user may request a notification for a VOD broadcast or a broadcast that has ended. FIG. 18A illustrates that an UI object 321 for receiving a notification request for an already ended broadcast image is displayed, and FIG. 18B illustrates that an UI object 322 for receiving a notification request for a broadcast that has ended is displayed. With respect to a request for notification of the broadcast that has ended, the user may be provided with an opportunity to purchase products available for order during the broadcast at a later time.

Figure 19:
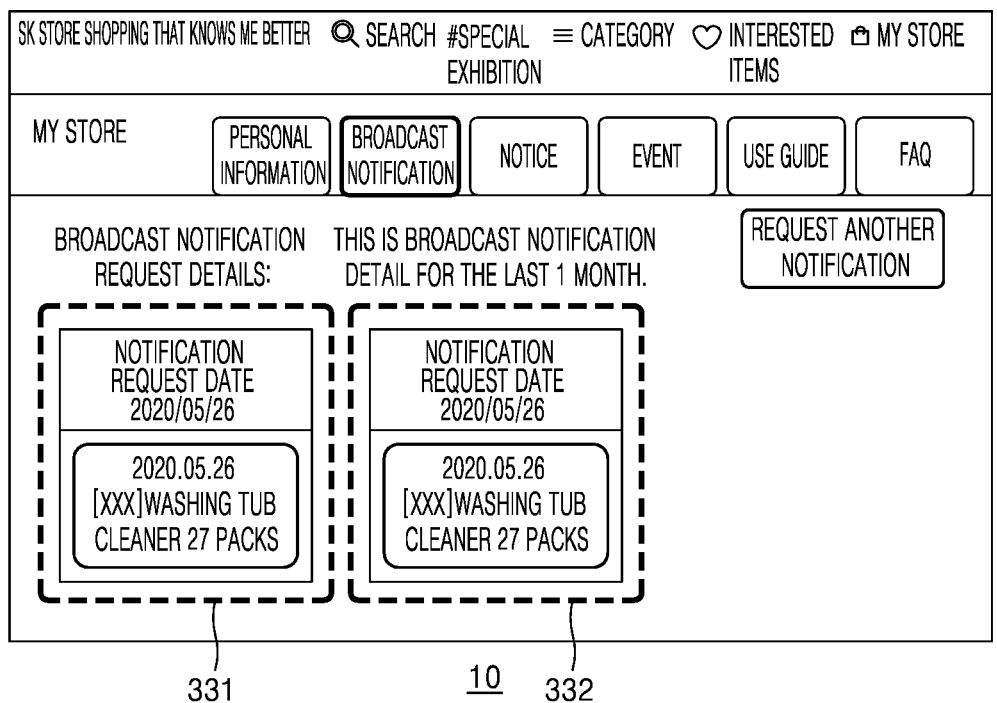
Figure 20:
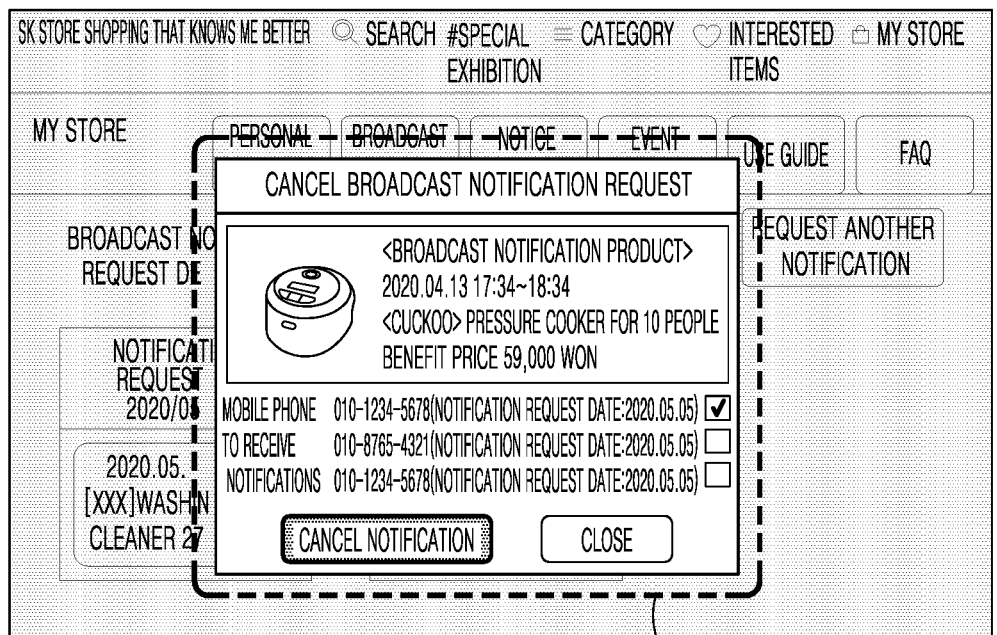
Figure 21A:
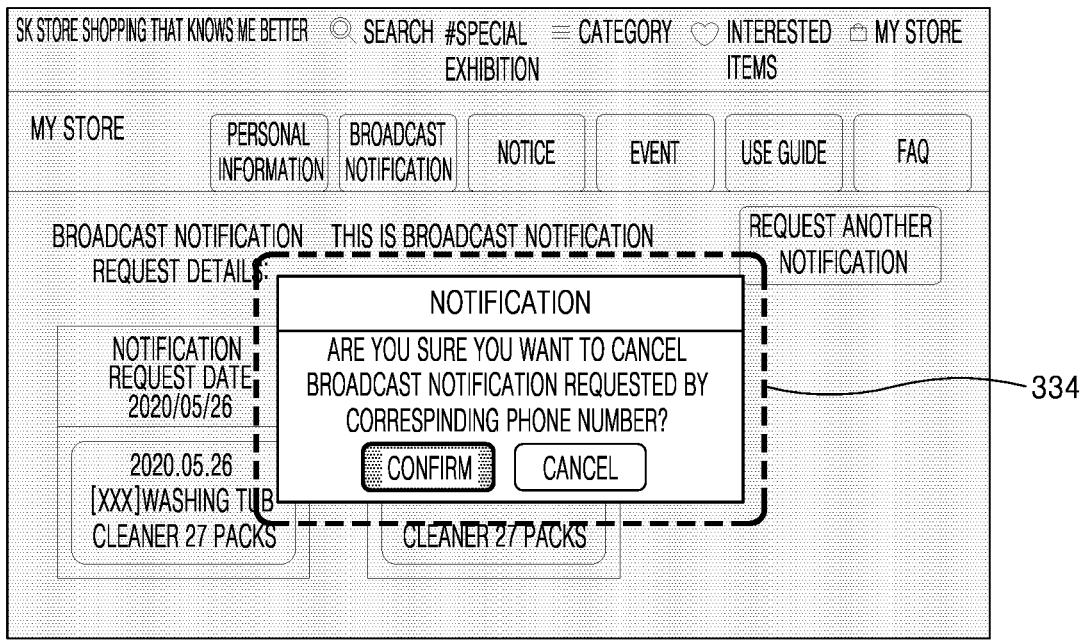
FIG. 21A illustrates an UI object for confirming the notification cancellation request.
Figure 21B:
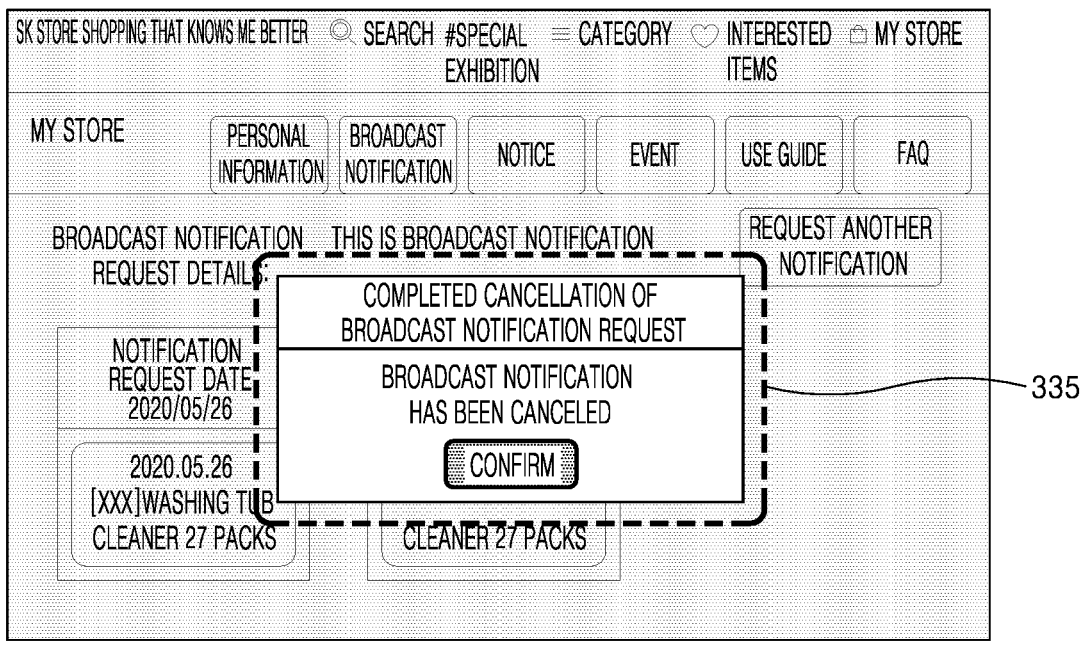

FIGS. 19 to 21 are diagrams for explaining a method of managing a broadcast notification request for each user according to an embodiment of the present disclosure. More specifically, FIG. 19 illustrates a screen on which notification request details of a broadcast previously requested by a mobile terminal are output. FIG. 20 illustrates selecting a specific notification request from among a plurality of notification requests. FIG. 21A illustrates an UI object for confirming the notification cancellation request. FIG. 21B illustrates an UI object for indicating that the notification cancellation request is completed.

According to an embodiment of the present disclosure, the media providing server 50 may receive a notification request detail request signal and mobile terminal information from the set-top box 20. Thereafter, the media providing server 50 may transmit information about the notification request signal previously requested by the corresponding user to the set-top box 20 based on the mobile terminal information. The TV 10 connected to the set-top box 20 may receive the notification request signal for each user received by the set-top box 20 and display the notification request signal on the display.

FIG. 19 shows a screen on which notification request details 331 and 332 of a broadcast previously requested by the mobile terminal are output on the TV 10. This allows the user to check and manage a plurality of broadcast notification requests through an individual page. In addition, the user may also cancel notifications for each of a plurality of broadcast notification requests on the individual page.

In response to a user input for selecting a specific notification request from among the plurality of notification requests 331 and 332 shown in FIG. 19, as shown in FIG. 20, the TV 10 may further display a UI object 333 for canceling a corresponding notification request.

On the other hand, according to one embodiment, a plurality of users may request for a broadcast notification using one TV 10. In addition, the plurality of users may also individually request cancellation of a broadcast notification using one TV 10. For example, as shown in FIG. 20, when three users make a notification request for a pressure cooker broadcast using the TV 10, only a notification request from a user using a mobile phone number "010-1234-5678" may be canceled.

As described above, the set-top box 20 that has received the notification cancellation request through the TV 10 transmits the notification cancellation request to the media providing server 50, and the TV 10 may further display a UI object 334 for confirming the notification cancellation request as shown in FIG. 21A and an UI object 335 indicating that the notification cancellation request is completed as shown in FIG. 21B.

The device and/or system described above may be implemented as hardware components, software components, and/or combinations of the hardware components and the software components. The devices and components described in the embodiments are implemented using one or more general purpose computers or special purpose computers, such as, for example, a processor, controller, arithmetic logic unit (ALU), digital signal processor, microcomputer, field programmable gate array (FPGA), programmable logic unit (PLU), microprocessor, or any other device capable of executing and responding to instructions. A processing device may execute an operating system (OS) and one or more software applications running on the OS. The processing device may also access, store, manipulate, process, and generate data in response to execution of the software. For convenience of understanding, although a processing device is sometimes described as being used as a single device, a person of ordinary skill in the art may recognize that the processing device may include a plurality of processing elements and/or a plurality of types of processing elements. For example, the processing device may include a plurality of processors or one processor and one controller. In addition, other processing configurations are possible, such as parallel processors.

The software may include a computer program, code, instructions, or a combination of one or more thereof, and may configure the processing device to operate as desired, or may independently or collectively instruct the processing device. Software and/or data may be permanently or temporarily embodied in some type of machine, component, physical device, virtual equipment, computer storage medium or device, or transmitted signal wave, for interpretation by a processing device or for providing instructions or data to the processing device. The software may be distributed over networked computer systems and stored or executed in a distributed manner. Software and data may be stored in one or more computer-readable recording media.

The method according to the embodiment may be implemented in the form of program instructions that may be executed through various computer means to be recorded in a computer-readable medium. The computer-readable medium may include program instructions, data files, data structures, and the like, alone or in combination. The program instructions recorded on a medium may be specially designed and configured for the embodiment, or may be known and available to those skilled in the art of computer software. Examples of the computer-readable recording medium include magnetic media such as hard disks, floppy disks and magnetic tapes, optical media such as CD-ROMs and DVDs, magneto-optical media such as a floptical disk, and hardware devices specially configured to store and execute program instructions, such as ROM, RAM, flash memory, and the like. Examples of program instructions include not only machine language codes such as those generated by a compiler, but also high-level language codes that may be executed by a computer using an interpreter or the like. The hardware devices described above may be configured to operate as one or more software modules to perform the operations of the embodiments, and vice versa.

Although the present disclosure has been described with reference to one embodiment shown in the drawings, this is merely exemplary, and it will be understood by those skilled in the art that various modifications and variations of embodiments are possible therefrom. For example, even if the described techniques are performed in an order other than the described method, components of the described system, structure, apparatus, or circuit are combined or combined in a form other than the described method, or replaced or substituted by other elements or equivalents, appropriate results may be achieved. Thus, the substantial technical protection scope of the present disclosure should be determined by technical ideas in the appended claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of requesting a broadcast notification, the method comprising:
   receiving, at a set-top box, a notification request signal for a broadcast from a selected mobile terminal;
   receiving, at the set-top box, mobile terminal information of the selected mobile terminal and associated with the notification request signal;
   transmitting, with the set-top box, the notification request signal, and the mobile terminal information to a data server;
   transmitting, to the selected mobile terminal, with the data server, a product purchase guide message related to product information corresponding to the broadcast and associated with the notification request signal;
   receiving, at the data server, a notification request detail request signal; and
   in response to the data server receiving the notification request detail request signal and the mobile terminal information from the set-top box, generating resultant notification request signal information corresponding to the selected mobile terminal and transmitting the resultant notification request signal information to the set-top box through a network.

2. The method of claim 1, wherein receiving the notification request signal further includes:
   with respect to a selected product related to the broadcast available for order to be limited during a broadcast time, receiving a product order request signal and the mobile terminal information during the broadcast time.

3. The method of claim 2, wherein transmitting the product purchase guide message further includes transmitting the product purchase guide message to the selected mobile terminal in response to receiving the order request signal and the mobile terminal information when receipt of the order request signal is within the broadcast time.

4. The method of claim 1, further comprising:
   receiving a broadcast notification cancellation request signal and another mobile terminal information; and
   not transmitting, with the data server, the product purchase guide message to the mobile terminal.

5. The method of claim 1, further comprising:
   upon receiving a purchase order request signal using the product purchase guide message, generating order information relevant to the purchase order request signal; and
   separately performing tagging on the generated order information.

6. The method of claim 1, further comprising:
   receiving, at a set-top box, a plurality of notification request signals for the broadcast from a plurality of mobile terminals including the selected mobile terminal;
   receiving, at the set-top box, a set of mobile terminal information associated with the plurality of notification request signals;
   in response to receiving a set of notification request detail request signals and the set of mobile terminal information from the set-top box, generating a set of resultant notification request signal information associated with one or more broadcast that are scheduled to be aired.

7. The method of claim 6, wherein:
   transmitting the resultant notification request signal information further includes:
      upon receiving a cancellation request signal for a specific notification request signal among the plurality of notification request signals, not transmitting the set of resultant notification request signal information to the set-top box.

8. The method of claim 1, wherein:
   receiving the notification request signal for the broadcast and the mobile terminal information further includes:
      receiving a first notification request signal for a first broadcast and first mobile terminal information; and
      receiving a second notification request signal for the first broadcast and second mobile terminal information, and
   transmitting the product purchase guide message related to the broadcast further includes transmitting, by the data server, a product purchase guide message related to the first broadcast to the first mobile terminal and the second mobile terminal.

9. The method of claim 8, further comprising:
   receiving a notification cancellation request signal for the broadcast and a first mobile terminal information, and
   wherein transmitting the product purchase guide message further includes transmitting, with the data server, the product purchase guide message to the second mobile terminal, and not transmitting the product purchase guide message to the first mobile terminal.

10. A non-transitory computer-readable recording medium on which a computer program for performing the method of claim 1 is recorded.

11. A broadcast notification request generation system comprising:
    a data server configured to transmit a message to a mobile terminal; and
    a media providing server communicatively coupled to the data server via a network and connected to a set-top box,
    wherein the media providing server is configured to:
       receive a notification request signal for a broadcast and mobile terminal information from the set-top box,
       request the data server to transmit a product purchase guide message related to product information corresponding to the broadcast, and
       in response to receiving a notification request detail request signal and the mobile terminal information from the set-top box, generate and transmit resultant notification request signal information corresponding to the mobile terminal to the set-top box.

12. The broadcast notification request generation system of claim 11, wherein, with respect to a product related to the broadcast available for order within a broadcast time, the media providing server is further configured to receive an order request signal for the product and the mobile terminal information within the broadcast time.

13. The broadcast notification request generation system of claim 11, wherein:
the media providing server is further configured to receive a notification cancellation request signal for the broadcast and the mobile terminal information, and
the data server does not transmit the product purchase guide message to the mobile terminal at a specified time.

14. The broadcast notification request generation system of claim 11, wherein:
the product purchase guide message includes product information including a product name, broadcast date and time, and a product order link,
the product order link is connected to a product order page.

15. The broadcast notification request generation system of claim 11, wherein, when the product is ordered using the product purchase guide message, the media providing server separately performs tagging on the generated order information.

16. The broadcast notification request generation system of claim 11,
wherein in response to receiving the notification request detail request signal and the mobile terminal information from the set-top box, the media providing server transmits, to the set-top box, the resultant notification request signal information in connection with the broadcast that is scheduled to be broadcast.

\* \* \* \* \*